Patented Oct. 13, 1931

1,826,721

UNITED STATES PATENT OFFICE

WILHELM BAUER AND LUDWIG ZEH, OF LEVERKUSEN-ON-THE-RHINE, GERMANY, ASSIGNORS TO GENERAL ANILINE WORKS, INC., OF NEW YORK, N. Y., A CORPORATION OF DELAWARE

INDIGOID DYESTUFF

No Drawing. Application filed July 7, 1930, Serial No. 466,340, and in Germany July 29, 1929.

The present invention relates to an indigoid dyestuff, more particularly it relates to a dyestuff of the formula:

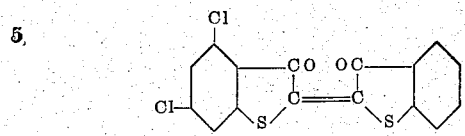

The new dyestuff is obtainable by condensing 4.6-dichloro-3-hydroxy-thionaphthene with a reactive alpha-derivative of 3-hydroxy-thionaphthene or by condensing a reactive alpha-derivative of 4.6-dichloro-3-hydroxy-thionaphthene with 3-hydroxy-thionaphthene, as is more fully described in the example.

The dyestuff thus obtainable, the asymmetrical 4.6-dichloro-bis-thionaphthene indigo, is a pink crystalline powder, yielding a yellow vat from which textile fibers, after oxidation, are dyed clear and powerful ruby shades of excellent fastness to chlorine and light. Furthermore, the dyestuff is well suitable for calico printing on account of the ease with which it can be fixed on the fiber.

The invention is illustrated by the example:

*Example:* 282 parts by weight of the 2-(para-dimethylamino)-anile of 2.3-diketo-dihydrothionaphthene (obtainable by the action of nitroso-dimethylaniline on an alkaline solution of 3-hydroxy-thionaphthene) and 219 parts by weight of 4.6-dichloro-3-hydroxy-thionaphthene are heated in 4000 parts by weight of glacial acetic acid, while stirring until the separation of the dyestuff is complete. The dyestuff is sucked off, washed with water and dried. It is a pink colored crystalline powder, which is scarcely soluble in organic solvents and which dissolves difficultly in sulfuric acid with a green coloration. It yields a yellow vat with alkaline hydrosulfite, from which textile fibers are dyed clear ruby shades of excellent fastness properties, especially to light.

The same dyestuff is obtainable by heating 351 parts by weight of the 2-(para-dimethylamino-)-anile of 4.6-dichloro-2.3-diketo-dihydrothionaphthene (obtainable by the action of nitroso-dimethylaniline on an alkaline solution of 4.6-dichloro-3-hydroxy-thionaphthene) and 150 parts by weight of 3-hydroxy-thionaphthene in glacial acetic acid. The 4.6-dichloro-3-hydroxy-thionaphthene is obtainable, for example, by the action of aluminium chloride upon the chloride of the 3.5-dichlorophenyl-1-thioglycolic acid.

The new dyestuff is also suitable for preparing a leuco sulfuric acid ester thereof.

We claim:

As a new indigoid dyestuff the asymmetrical 4.6-dichloro-bis-thionaphthene indigo of the formula:

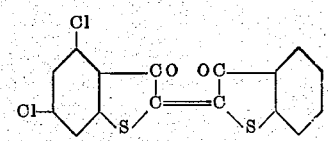

said dyestuff being a pink crystalline substance, scarcely soluble in organic solvents, difficultly soluble in sulfuric acid with a green coloration, yielding a yellow vat from which textile fibers after oxidation are dyed clear powerful ruby shades of excellent fastness properties.

In testimony whereof, we affix our signatures.

WILHELM BAUER.
LUDWIG ZEH.